US005592181A

United States Patent [19]

Cai et al.

[11] Patent Number: 5,592,181

[45] Date of Patent: Jan. 7, 1997

[54] VEHICLE POSITION TRACKING TECHNIQUE

[75] Inventors: Khiem V. Cai, Brea; Roger J. O'Connor, Dove Canyon, both of Calif.

[73] Assignee: Hughes Aircraft Company, Los Angeles, Calif.

[21] Appl. No.: 443,519

[22] Filed: May 18, 1995

[51] Int. Cl.$^6$ .................................................. G01S 3/02

[52] U.S. Cl. .......................... 342/457; 342/446; 342/442

[58] Field of Search .................................... 342/446, 445, 342/442, 457

[56] References Cited

U.S. PATENT DOCUMENTS

| | | | |
|---|---|---|---|
| 4,057,803 | 11/1977 | Coleman | 343/113 R |
| 4,509,052 | 4/1985 | Cash | 343/418 |
| 4,626,859 | 12/1986 | Stansfield | 342/442 |
| 4,701,762 | 10/1987 | Apostolos | 342/417 |
| 5,227,803 | 7/1993 | O'Connor et al. | 342/442 |

*Primary Examiner*—Thomas H. Tarcza
*Assistant Examiner*—Dao L. Phan
*Attorney, Agent, or Firm*—G. S. Grunebach; M. W. Sales; W. K. Denson-Low

[57] ABSTRACT

A method and system for tracking the position of a moving transmitter using angle of arrival measurements from direction finding antenna arrays. Each array includes several elements, with the elements grouped to provide subarrays of different element spacings which are multiple of one half the transmitter wavelength. Ambiguity is rejected by processing angle data received from the subarrays. The signals from the arrays are processed to convert electrical phase delay into spatial angles, the spatial angle data is processed to provide the x,y position, velocity and acceleration of the transmitter. For transmitters mounted in moving vehicles, the system further processes the x,y data and applies a quality weighting factor that filters out multipath factors and permits estimation of vehicle profile information.

30 Claims, 6 Drawing Sheets

ANTENNA ARRAY #2
70
ah
(x2,y2)
β2
α2
H2
50
X
Y
vh
X
42
40
VEHICLE PROFILE
H1
ANTENNA ARRAY #1
60
α1
ah
(x1,y1)
β1

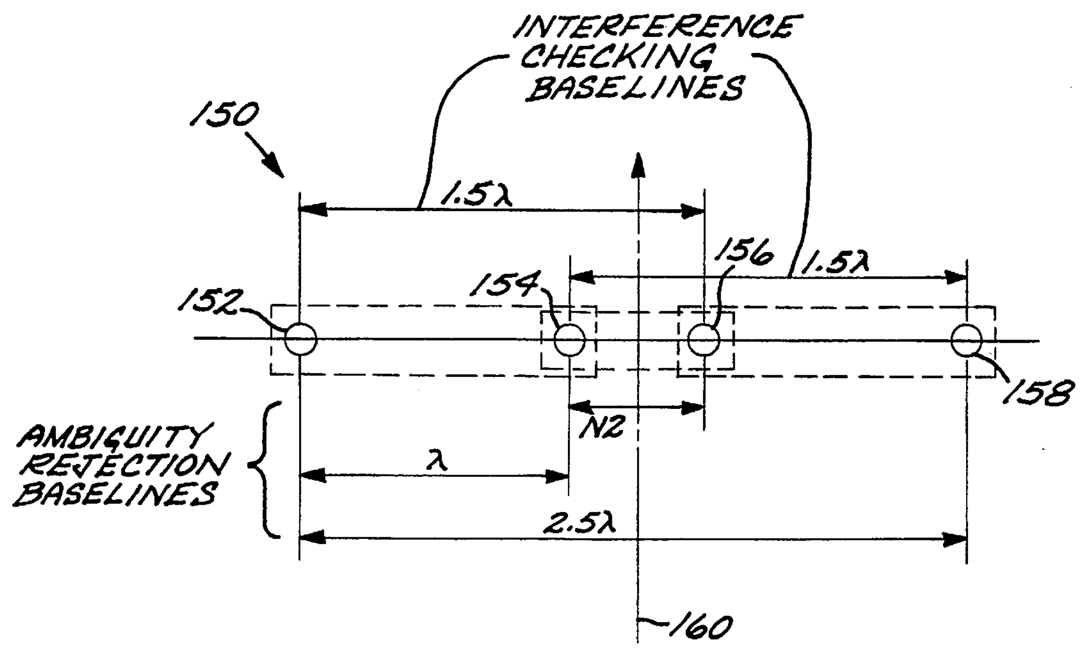
FIG. 3A
FIG. 3B
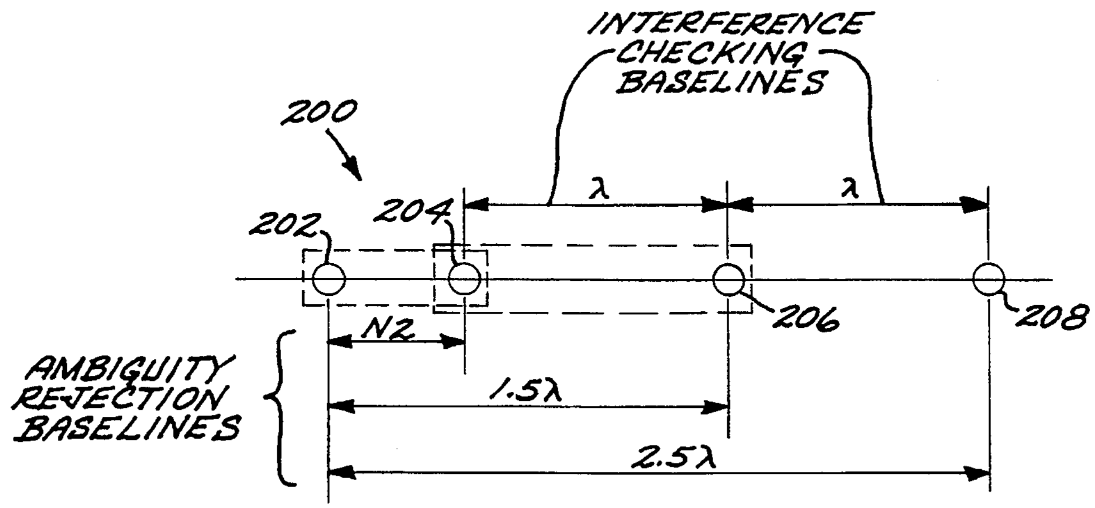

ERROR
ON RANGE
PER 5°
AOA ERROR
MAX dX
MIN dX
(0,-6)
B2=45°
(20,-6)
Y
X
(0,-6)
B1=45°

ERROR
ON LANE
PER 5°
AOA ERROR
MAX dY
(0,-6)
B2=45°
(20,-6)
Y
X
(0,-6)
B1=45°

PROCESSOR
100
A/D
97
98
85
RF DETECTOR
THRESHOLD
87
A/D GAIN & OFFSET
GAIN
96
86
VOLTAGE REF.
88
95
LOG VIDEO
LOGA-RITHMIC AMP
83
93
82
92
101
102
BPF
81
91
CONTROL REGISTER
D
Q
CLK
89
SW IN 60
SW IN 70
SW IN "N"
REF. IN 60
REF. IN 70
REF. IN "N"
ARRAY SELECT
ARRAY STROBE
3
N
70
70A
70B
70C
70N
71
60
60A
60B
60C
60N
61

VEHICLE POSITION TRACKING TECHNIQUE

TECHNICAL FIELD OF THE INVENTION

This invention relates to systems for accurately tracking the positions of vehicles using angle-of-arrival measurements.

BACKGROUND OF THE INVENTION

Current vehicle detection systems use antenna patterns to define transmitter locations on highway systems. The location accuracy of these systems is very poor and requires multiple large antennas to improve the performance. Receive amplitude measurement techniques can improve the performance somewhat but variations in signal strength between different vehicles have been measured at greater than 10 dB and the antenna patterns from these vehicles are not uniform. These problems have limited the use of "open road" toll systems and have resulted in the use of "barrier" toll systems that establish vehicle separation for location identification purposes.

Commonly assigned U.S. Pat. No. 5,307,349 describes a technique which will permit vehicles to be able to communicate with the highway infrastructure. One use for the system described in U.S. Pat. No. 5,307,349 is for the collection of tolls electronically on an open road. Commonly assigned U.S. Pat. No. 5,227,803 describes a method of measuring the location of the transmitters mounted in vehicles.

SUMMARY OF THE INVENTION

This invention concerns a technique that combines multiple location position measurements, filters measurements that contain errors, and presents an efficient closed form set of position calculation equations to provide a tracking algorithm. A system in accordance with the invention includes two or more antenna arrays that measure the signal phase differences, a phase unwrapping process to determine the spatial signal Angle of Arrival (AOA), a position process that determines the transmitter location and vehicle tracking processing to estimate velocity, acceleration and position. The system also has a quality factor analysis that filters out multipath distorted samples.

This invention offers several advancements in vehicle location and tracking technology.

(i) An open road gantry with several multi-element antenna arrays measure the phase of the transmit signal.

(ii) Antenna arrays can be rotated to maximize antenna coverage and increase tracking accuracy.

(iii) redundant antenna array element spacing is used on checking baselines. These checking baselines are used to weight position measurements to reduce errors caused by multipath.

(iv) AOA measurements are converted to position measurements using either a search algorithm or the solution of quadratic equations.

(v) Vehicle travel profile estimates use a weighted least mean square error prediction method with checking baseline weighting.

A method is described for tracking a moving transmitter which transmits RF signals, comprising the following steps:

positioning first and second antenna arrays is a spaced arrangement relative to an area in which the transmitter is moving, each antenna array comprising a plurality of antenna elements arranged in spaced relationship, the elements grouped in a plurality of subarrays of elements, wherein the element-to-element spacings of elements in the subarrays are different multiples of one half the transmitter wavelength of operation;

receiving RF signals from the transmitter using the first and second antenna arrays and converting subarray signals from each array signals into digital data;

processing the digital data to provide phase data indicative of the electrical phases of signals received at the different subarrays of the first and second antenna arrays;

converting the phase data into spatial angle data indicative of angle of arrival of RF signals incident on the subarrays of the first and second antenna arrays; and processing the spatial angle data with antenna configuration data indicative of the location and geometry of the first and second antenna arrays to provide information specifying an estimated position of the transmitter.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3A illustrates a preferred antenna array geometry for the system of FIG. 1.

FIG. 3B illustrates an alternate antenna array geometry for the system of FIG. 1.

FIG. 4A shows the X (range) error values, and FIG. 4B shows the Y (lane) error values.

DETAILED DESCRIPTION OF THE PREFERRED EMBODIMENT

Figure 1:
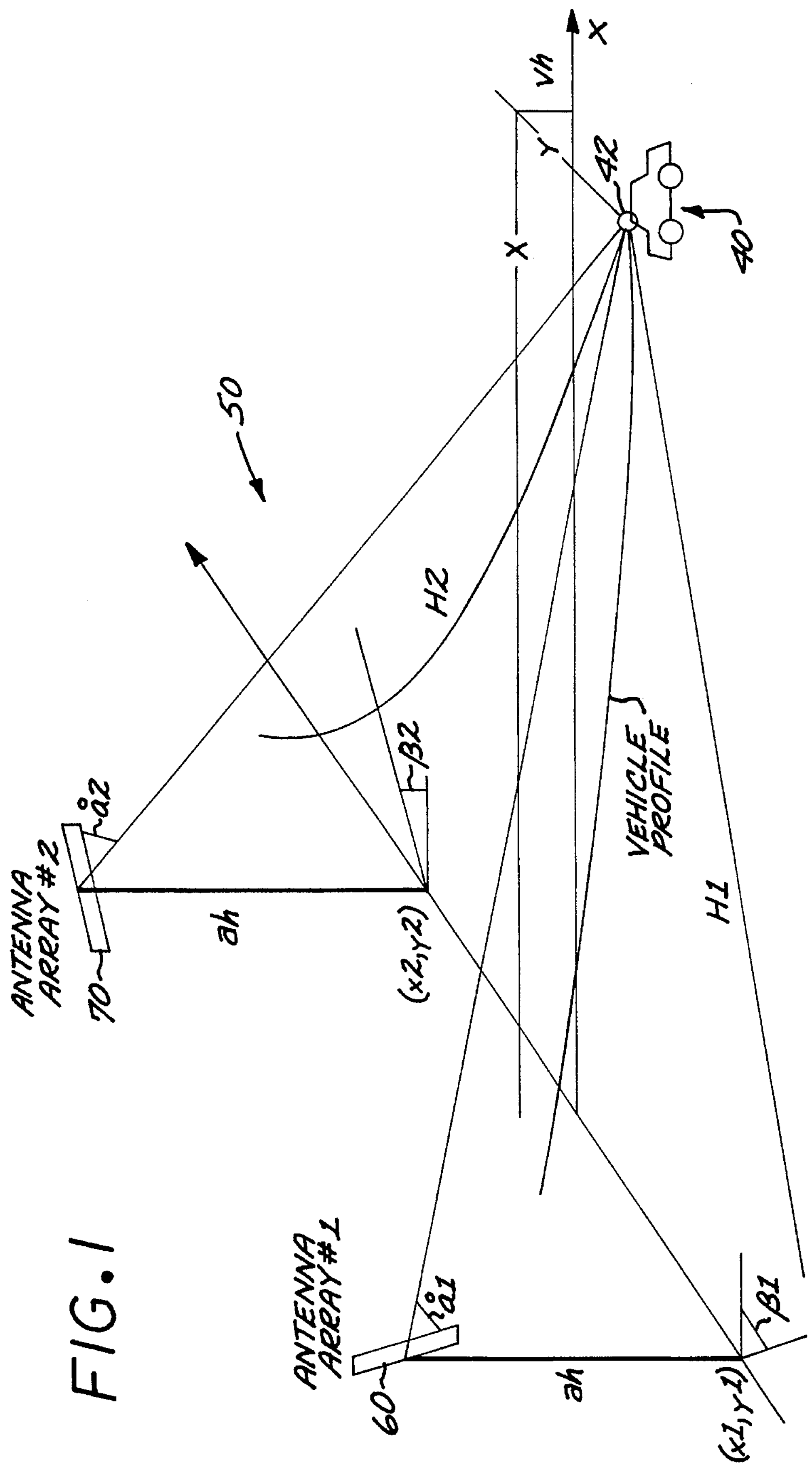
FIG. 1 illustrates a transmitter location system employing direction finding antennas.

The position of a moving transmitter can be detected by Direction Finding (DF) antenna systems. FIG. 1 shows a transmitter location system 50 tracking the position of a moving vehicle 40 carrying a transmitter 42. The conventions used in this figure are as follows: x1, y1 represent the coordinates of antenna array 60. x2, y2 represent the coordinates of antenna array 70. β1, β2 represent the respective angle rotations of the two antennas 60 and 70. ah represents the height of the antenna arrays on a gantry. x,y represent the position of the transmitter 42; $v_h$ represents the height of the transmitter. å1 and å2 represent the angle of arrival measured from the respective antenna arrays 60 and 70.

The location of the transmitter 42 is determined by intercepting the transmit signal with the DF antenna arrays 60 and 70. Two or more DF antennas are used to measure the electrical phase of the signals at the respective antennas, and this information is then converted to spatial angle of arrival (AOA) values. Based on two AOA values, two half hyperbolas H1 and H2 are identified on the surface of the road. These two AOA values are determined on the same signals or signals segments separated by a small time so that the positions are not changed significantly. These hyperbolas are used to solve for the position location (X, Y) of the vehicle 40 by finding their intersection. This process is repeated at different times and multiple positions of the vehicle are determined. The positions are combined with weighting, based on check baseline measurements, to determine the transmitter position profile and its characteristics such as acceleration, velocity and time of arrival at a specific location.

Figure 2:
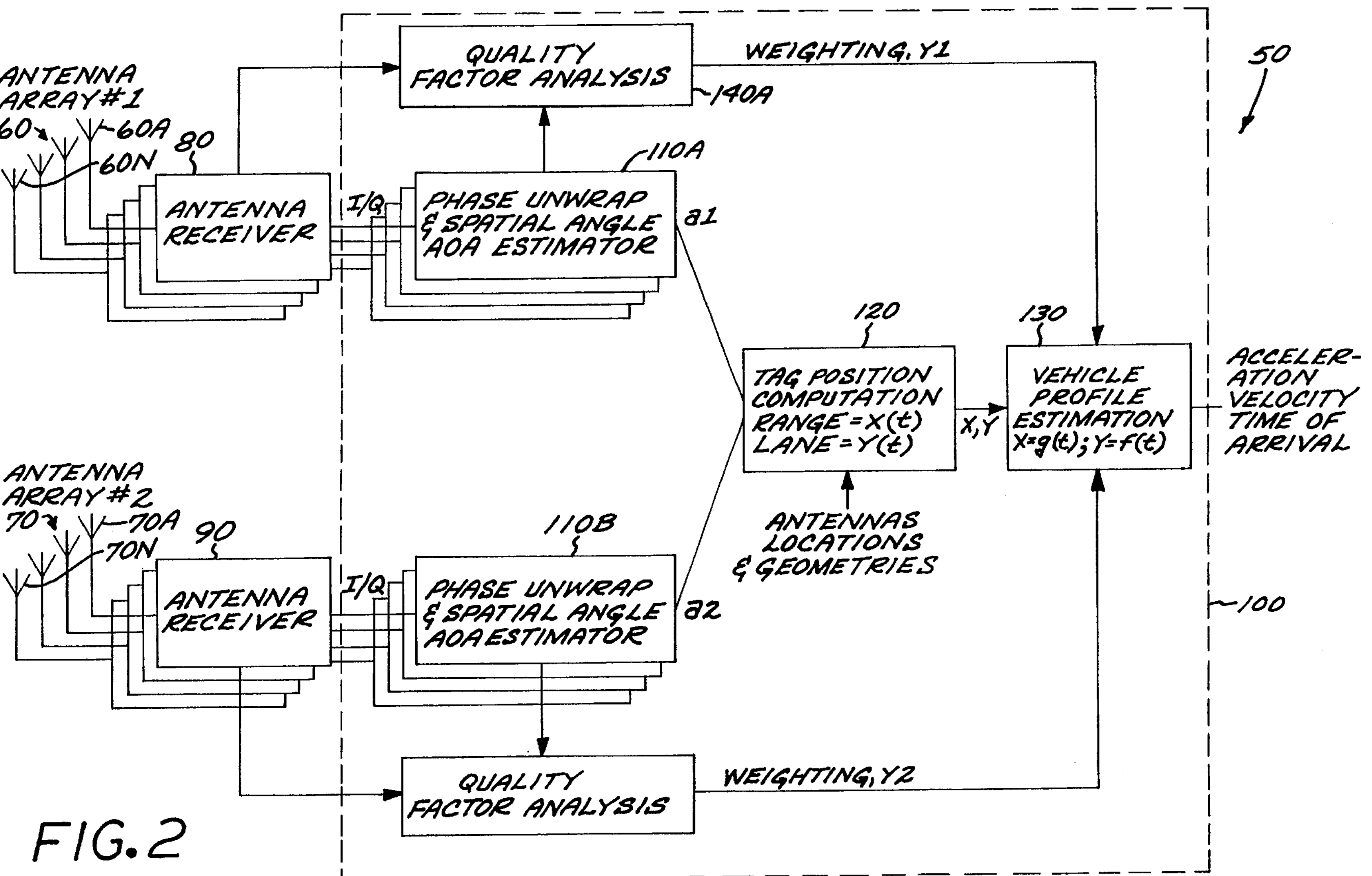
FIG. 2 is a functional block diagram of the system of FIG. 1.

FIG. 2 shows a functional block diagram of the target location system 50. The system includes the two array antennas 60 and 70, two array antenna receivers 70 and 80 to measure the received phases, and a processor 100. The processor performs several processor functions, including phase unwrapping processing functions 110A and 110B to determine the spatial AOA; a transmitter position processing function 120 to determine the location of the transmitter; and a vehicle profile processing function 130 to estimate the vehicle motion characteristics. The processor further performs quality factor analysis functions 140A and 140B to identify which samples are reliable and which are not, and to assign a weighting to each sample that minimizes the effect of interference of multipath interference.

In the process of communicating, the vehicle transmitter 42 transmits bursts of RF. U.S. Pat. No. 5,307,349 describes an exemplary protocol which can be used to coordinate the transmissions of RF bursts. These signal bursts are received by at least two DF antenna arrays, i.e., by antenna arrays 60 and 70, which supply electrical phase difference measurements between signals received at the array elements 60A–60N and 70A–70N. The arrays have N elements and provide N-1 phase difference measurements. These N-1 measurements are "unwrapped" to form a spatial angle of arrival for each array, i.e., the measurements are processed to find a unique AOA solution. This unwrapping technique is described in further detail in commonly assigned, co-pending patent application serial number 08/443,536, filed May 18, 1995 filed concurrently herewith, entitled "A Technique to Detect Angle of Arrival With Low Ambiguity," by K. V. Cai, attorney docket PD-94257, the entire contents of which are incorporated herein by this reference. Alternatively, the electrical phase information can be converted to spatial angle data using the technique described in "Ambiguity-Resistant Three- and Four-Channel Interferometers," Robert L. Goodwin, NRL Report 8005, Sep. 9, 1976.

The antenna elements on each array are arranged so that the spatial AOA can be determined accurately, and without ambiguity. In addition, redundant baseline measurements are used as check baselines to establish a quality indication that is used in weighting the vehicle profile estimate.

FIGS. 3A and 3B illustrate two embodiments of DF antenna arrangements, each having the same base of 2.5λ, i.e., the largest separation between any pair of elements is 2.5Aλ. The DF antenna 150 includes four elements 152, 154, 156 and 158 spaced symmetrically about array center line 160. Adjacent elements 154 and 156 are separated by λ/2. Elements 152 and 156 are separated by 1.5λ. Elements 154 and 158 are separated by 1.5λ. Elements 152 and 158 are separated by 2.5λ. The transmitter RF wavelength is λ.

The elements of the array 150 can be considered as grouped into a plurality of subarrays or baselines, each baseline comprising a pair of antenna elements having a element-to-element spacing which is some multiple of one half λ. Thus, array 150 includes elements 154 and 156 which are spaced by λ/2 to form a first baseline, elements 152 and 154 which are spaced by λ to form a second baseline, elements 154 and 158 which are spaced by 1.5λ to form a third baseline, elements 152 and 156 are spaced by 1.5λ to form a fourth baseline, and elements 152 and 158 form a fifth baseline spaced by 2.5λ. The third and fourth baselines are of the same element spacing and can be used as checking baselines, since the same phase shift value should nominally be determined at both baselines.

The array 150 is characterized by the "phase-unwrap" baseline factors (defined, for a given baseline, as the ratio of the element spacing to the signal wavelength) of k=(½, 1, 2.5), and two checking baseline factors $c_1=c_2=1.5$, which can be used for quality indication functions. The phase-unwrap baselines are in this examples, the first, second and fifth baselines, and the checking baselines are the third and fourth baselines.

DF antenna 200 also comprises four antenna elements 202, 204, 206 and 208. The elements are spaced differently than the elements of array 150. Elements 202 and 204 are spaced λ/2 apart in a first baseline, elements 202 and 206 are spaced 1.5λ in a second baseline, elements 202 and 208 are spaced apart 2.5λ in a third baseline, and elements 204, 206 and 208 are spaced apart by λ in a fourth baseline. The array 200 has the phase-unwrap baseline factors of k=(½, 1.5, 2.5) and two checking baselines factor $c_1=c_2=1$.

The baseline of array 150 is superior to that of array 200, since the middle baseline of array 150 has a factor 1.0, and the middle baseline of array 200 has a factor 1.5, thereby yielding a better ambiguity rejection and better accuracy for checking. Moreover, the array 150 has the feature that no single element is included in each of the baselines. Thus, if any one element is damaged or fails to operate, some of the baselines will still operate.

The received electrical phases are processed by the phase unwrapping processing function 110A and 110B to determine the AOA. This phase unwrapping process in the preferred embodiment is a trellis search, which exploits the structure of the phase ambiguities and maximizes the detection performance. This technique searches for the shortest path from the shortest baseline, to the intermediate baselines, and finally to the longest baseline. From the shortest baseline the processor determines the minimum-ambiguous unwrapped phase. Based on this phase, the next shortest phase is examined, and the unwrapped phase closest to the last unwrapped phase is determined. This process progresses to the longest baseline to determine the unwrap phase that is used to determine the AOA. The phase unwrapping function is discussed more completely in commonly assigned, co-pending application Ser. No. 08/443,536, filed May 18, 1995, entitled "A Technique to Detect Angle of Arrival With Low Ambiguity," by K. V. Cai. The shortest baseline (λ/2) has only one AOA solution, but cannot provide the required accuracy. The longest baseline (5λ/2) has the required accuracy but has multiple spatial angles that generate the same electrical Δφ (phase shift) values. The technique is to select the longest baseline to achieve the required accuracy and the shortest baseline to resolve ambiguity.

As the result of the AOA detection, the transmitter 42 is located on the surface of a cone. If the height of the transmitter 42 is known (i.e., $z=v_h$), the tag must be located on one branch on the hyperbola. The equations of the two hyperbolas are as follows:

$$H_1: \operatorname{atan}(\dot{a}_1) = \sqrt{\frac{[(y-y_1)\cos\beta_1 + (x-x_1)\cos\beta_1]^2}{[(x-x_1)\cos\beta_1 - (y-y_1)\cos\beta_1]^2 + (a_h - v_h)^2}} \quad (1)$$

$$H_2: \operatorname{atan}(\dot{a}_2) = \sqrt{\frac{[(y-y_2)\cos\beta_2 + (x-x_2)\cos\beta_2]^2}{[(x-x_2)\cos\beta_2 - (y-y_2)\cos\beta_2]^2 + (a_h - v_h)^2}} \quad (2)$$

Therefore, the transmitter location (x, y) can be determined by finding the intersection of the two hyperbolas $H_1$ and $H_2$. The solution (x, y) to the above equations can be obtained via a search, starting from the intersection of the two asymptotes of $H_1$ and $H_2$. This technique is time consuming and is not practical for a toll collection application. A new technique was developed to achieve a "close-form" solution for the transmitter tag position. First, the two hyperbola equations are simplified to the following:

$$H_1: a_1x^2+a_2y^2+a_3xy+a_4x+a_5y+a_6=0 \quad (3)$$

$$H_2: b_1x^2+b_2y^2+b_3xy+b_4x+b_5y+b_6=0 \quad (4)$$

Next, substitute for x to establish a quadratic single-variable equation $$c_1y^4+c_2y^3+c_3y^2+c_4y+c_5=0 \quad (5)$$

and solve for y, and then use ($H_1$) or ($H_2$) to find x. There are a maximum of eight real solutions for (x, y). Equations 3 and 4 are then rechecked to determine the correct pair of (x, y). In the process of solving the equations, it is possible to determine values that are not solutions to the primary equations 1 and 2. These are eliminated by substituting all values back into the equations 1 and 2.

Figure 4A:
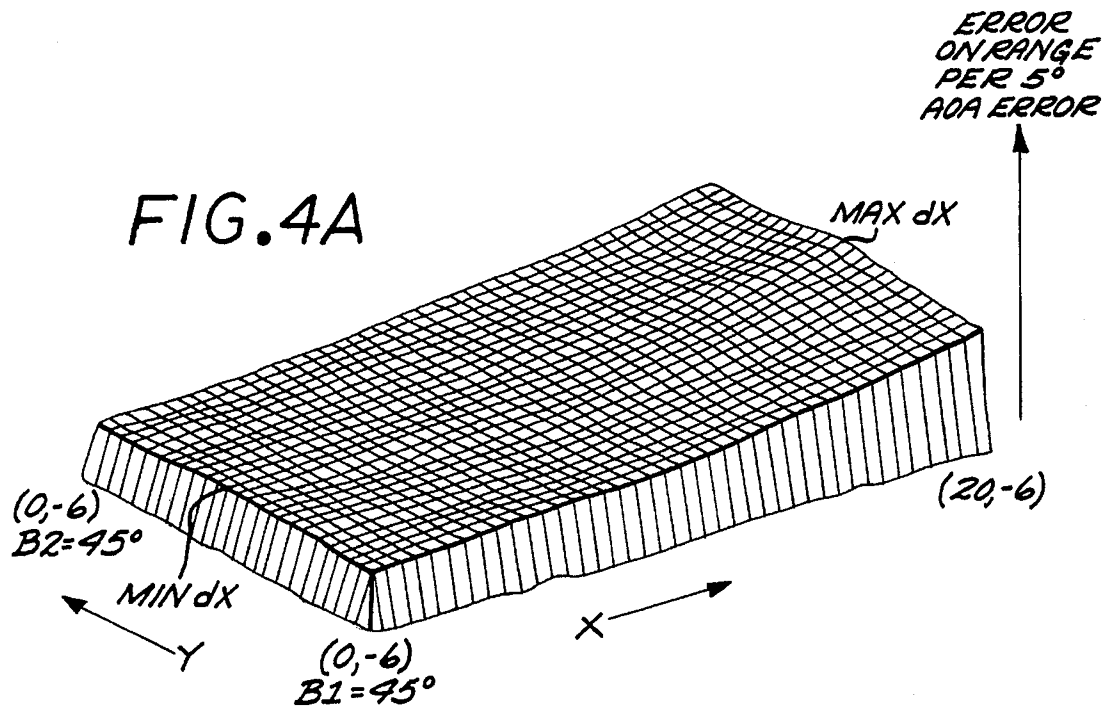
FIGS. 4A and 4B show the respective plots of (dx/då)(x,y) and (dy/då)(x,y) for $\beta_1$ and $\beta_2$ of 45°.
Figure 4B:
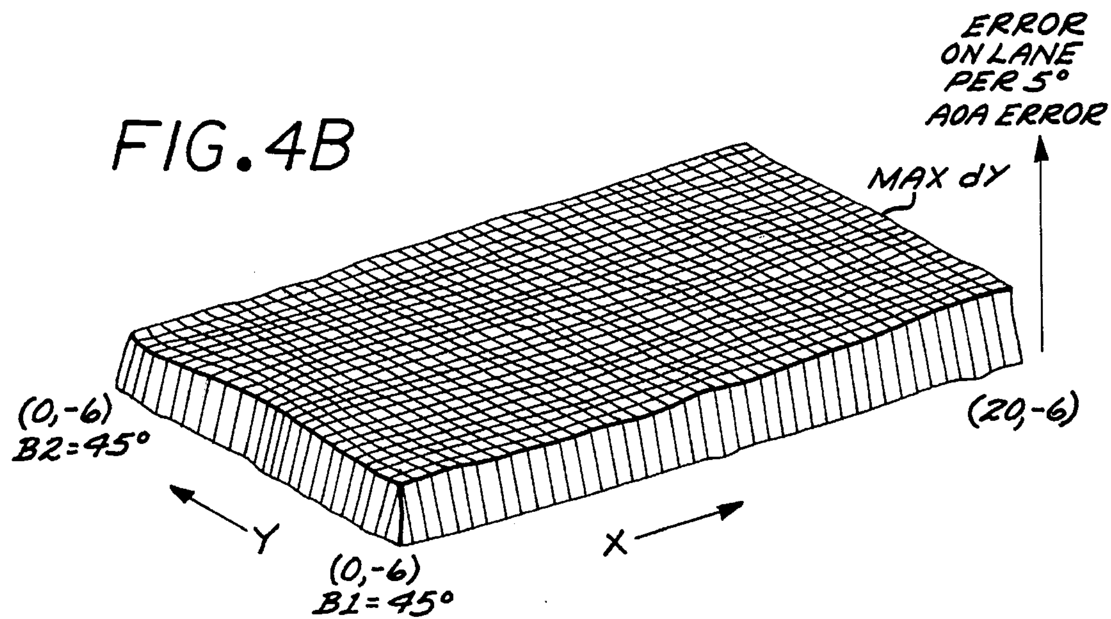

The position of the DF antennas 60 and 70 impacts the accuracy of the transmitter location measurement. If the axes of the two DF antenna arrays are on the y axis, the accuracy on the x axis is maximum (minimum dx/då), but the accuracy on the y location is minimum (large dy/då). Thus, the antennas must be rotated to focus on the area of interest. The rotation of the two antennas can be selected by varying $\beta_1$ and $\beta_2$ so that the two factors are within the expectation.

$$\frac{dx}{d\dot{a}}(x,y) = min\left[\frac{dx}{d\dot{a}_1}(x,y), \frac{dx}{d\dot{a}_2}(x,y)\right] \quad (6)$$

$$\frac{dy}{d\dot{a}}(x,y) = min\left[\frac{dy}{d\dot{a}_1}(x,y), \frac{dy}{d\dot{a}_2}(x,y)\right] \quad (7)$$

which are evaluated from equations 3 and 4. If the vehicle is confined in the area $[x \geqq 0,\ y_1 \leqq y \leqq y_2]$ the two angles should be selected to about 45° to 60° to balance both range (dx) and lane (dy) errors. FIGS. 4A and 4B shows the plot of (dx/då)(x,y) and (dy/då)(x,y) for $\beta_1$ and $\beta_2$ of 45°. FIG. 4A shows the X (range) error values, and FIG. 4B shows the Y (lane) error values.

In the presence of partial-time interference such as multipaths or burst noise, some AOA phase measurements can be corrupted, and the target location sample is thus in error. Such corrupted samples can be identified and processed to minimize the effects of partial time interference. Thus, in the DF antennas 60 and 70, two independent baselines of equal length should be established for checking purposes. When the two checking baselines are of equal length, the detected phase shift for each baseline must be equal. If they are not, there is an error, and thus a weighting should be applied to the measurement as shown in equations 8, 9 and 10 below. If the DF antennas do not have two independent baselines of equal length, any two baselines with factors $c_1$, $c_2$ can be used to establish the quality factor.

FIGS. 3A and 3B show two exemplary DF antenna arrays 150 and 200 with four elements on a base of 2.5λ. The antenna array 150 has the baseline factor of k=(½, 1, 2.5) and can provide AOA phase unwrapping with low ambiguity. Also, based on this structure, two baselines with factor 1.5 ($c_1$=$c_2$=1.5) can be obtained, and can be used to check the quality of the detected AOA.

Let $c_1$ and $c_2$($c_2 \geqq c_1$) be the two quality baselines. The quality indicator using Gaussian weighting is defined as follows:

$$\lambda=\exp(-\max(\beta_1^2,\beta_2^2)/2\sigma^2) \quad (8)$$

$$\beta_1=((c_2/c_1)\Delta\phi_{c(1)}-\Delta\phi_{c(2)})\bmod(-180, 180) \text{ at DF antenna } \mathbf{150} \quad (9)$$

$$\beta_2=((c_2/c_1)\Delta\phi_{c(1)}-\Delta\phi_{c(2)})\bmod(-180, 180) \text{ at DF antenna } \mathbf{200} \quad (10)$$

where σ is a selected value for the weighting scheme and is depended on the signal-to-noise ratio at the antenna receiver. In the absence of noise, both $\beta_1$ or $\beta_2$ are zeros, and the quality factor λ is 1. In the presence of strong interferers, however, it is most likely that $\beta_1$ or $\beta_2$ are large, the quality factor λ is reduced to almost zero and the impact of such location samples is suppressed. Other weighting can alternatively be used and can be effective against partial time interference. The tracking of a moving target requires many samples be collected and processed to predict the acceleration, velocity or time of arrival. The vehicle profile processing is performed separately for x-axis and y-axis. The movement of a vehicle in x-axis can be expressed as follows:

$$x(t)=(1/2)a\,t^2+v_ot+x_o \quad (11)$$

where x(t) is the x-position of the transmitter at time t, a is the constant x-acceleration, $v_o$ is the initial x-velocity, and $x_o$ is the x-position of the transmitter at time zero. However, since partial time interference signals can heavily corrupt some of the location samples, it is necessary to determine the quality factor $\lambda_i$ associated with each location sample and weight the samples as follows:

$$\begin{aligned}\gamma_1x_1 &= \gamma_1[(1/2)a\,t_1^2 + v_ot_1 + x_o]\\ \gamma_2x_2 &= \gamma_2[(1/2)a\,t_2^2 + v_ot_2 + x_o]\\ &\cdots\\ \gamma_nx_n &= \gamma_n[(1/2)a\,t_n^2 + v_ot_n + x_o]\end{aligned} \quad (12)$$

where $t_i$ represents the time at sample i, i=1, 2, n. The above can be expressed as:

$$D = T \cdot X \quad (13)$$

$$\text{where } D = \begin{pmatrix}\gamma_1x_1\\ \gamma_2x_2\\ \cdots\\ \gamma_nx_n\end{pmatrix};\ T = \begin{pmatrix}\gamma_1t_1^2\ \gamma_1t_1\ \gamma_1\\ \gamma_2t_2^2\ \gamma_2t_2\ \gamma_2\\ \cdots\\ \gamma_nt_n^2\ \gamma_nt_n\ \gamma_n\end{pmatrix};\ \text{and } X = \begin{pmatrix}a/2\\ v_o\\ x_o\end{pmatrix}$$

The objective is to solve for D to determine the vehicle profile on the x-axis.

$$X=(T'T)^{-1}T'D \quad (14)$$

Having a, $v_o$ and $x_o$, the x-coordinate of the vehicle is identified at any time. It is noted that the above equation has a solution only if the number of quality samples (among n samples) is larger or equal to 3. It is noted, however, that in many applications, where the transmitter is expected to travel at a constant speed, a can be set to 0, and the above equation is simplified to a two variable equation.

$$X = (TT)^{-1}TD \quad (15)$$

$$\text{where } D = \begin{pmatrix} \gamma_1 x_1 \\ \gamma_2 x_2 \\ \cdots \\ \gamma_n x_n \end{pmatrix}; T = \begin{pmatrix} \gamma_1 t_1 \gamma_1 \\ \gamma_2 t_2 \gamma_2 \\ \cdots \\ \gamma_n t^2 n \gamma_n \end{pmatrix}; \text{and } X = \begin{pmatrix} v_o \\ x_o \end{pmatrix}$$

and a minimum of two quality samples are needed to extract $v_o$ and $x_o$.

The process can be repeated for the y-position, and the transmitter position (x,y) is determined, and the time that the transmitter crosses the gantry line (x=0) can be identified from equation (11).

Figure 5:
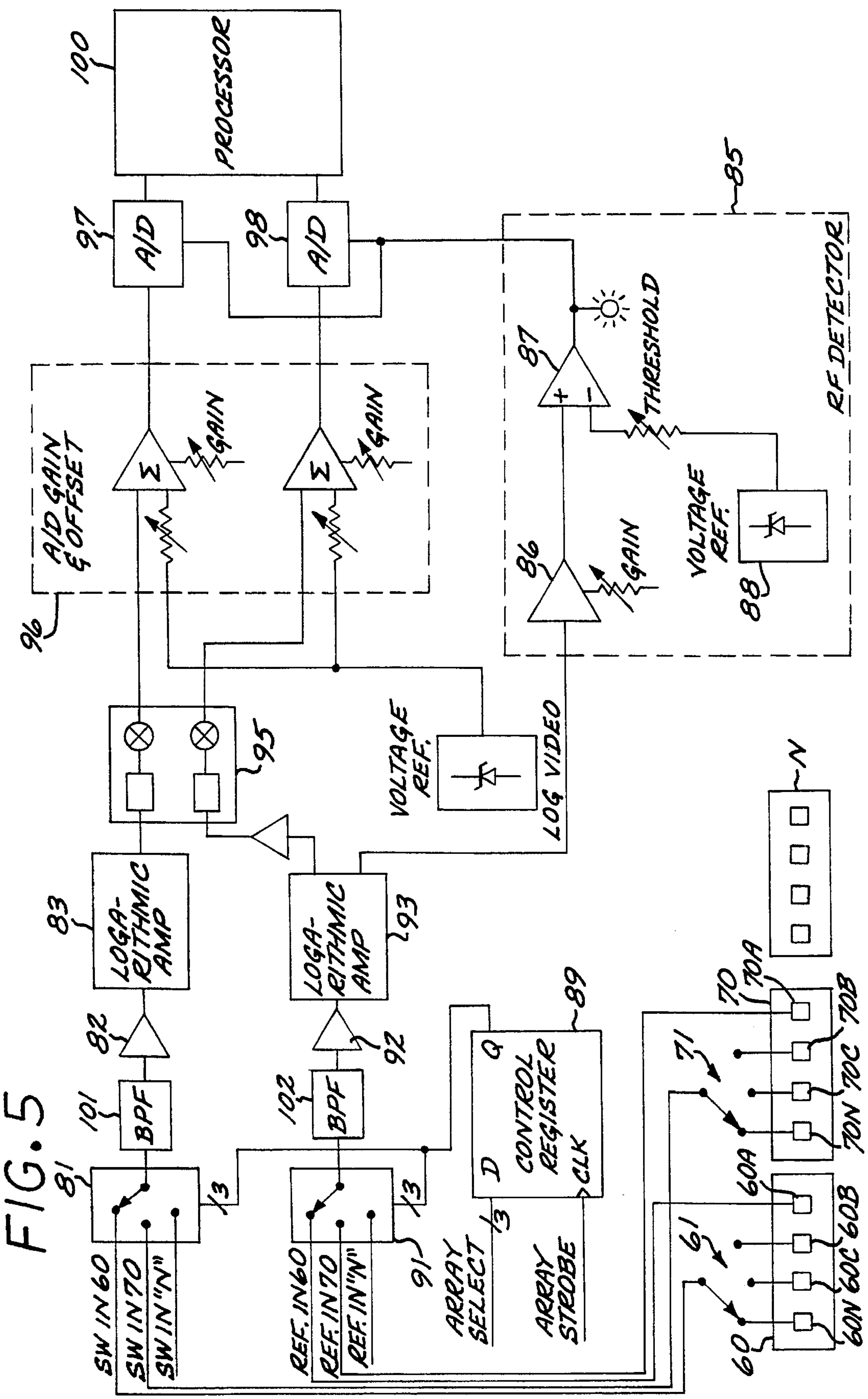
FIG. 5 is a schematic block diagram illustrative of an exemplary receiver used in the system of FIG. 1.

FIG. 5 illustrates a particular schematic block diagram implementation of elements of the system 50, and particularly the antenna receiver elements. The antenna array elements are connected to RF switches 81 and 91, which provide a means of switching receiver elements between antenna arrays to allow one set of receiver hardware to service both antenna arrays on a time multiplexed basis, thereby saving cost. Thus, one antenna array will be selected for a measurement.

In the embodiment of FIG. 5, the antennas 60 and 70 are the type of array 200 shown in FIG. 3B. Array 60 includes an RF switch 61 which switches among the elements 60B–60N, corresponding to elements 204, 206 and 208 of FIG. 3B, and the selected element is connected to an input of switch 81. Similarly, array 70 includes an RF switch 71 which switches among the elements 70B–70N, and connects the selected element to an input of switch 81. In general N arrays can be connected to the switch 81. Element 60A is connected as a reference element to an input of switch 91; this element is common to all the baselines of the array in this example. Similarly, element 70A is connected as a reference element to an input of switch 91.

The switches 81 and 91 select particular inputs, which are passed through respective gain stages 82 and 92 to increase the signal strength. The selected inputs are then passed through respective band pass filters 101 and 102 that filter out potential out-of-band interference signals. Respective logarithmic amplifiers 83 and 93 provide two functions. First, they provide amplification and a limited output signal (constant amplitude for all receive signals) to drive the synchronous phase detector 95. The second function is to provide a log video output of one channel, from amplifier 92. This video output is used to detect the presence of energy in the ASK modulated signal. In an exemplary embodiment, the transmission from the transmitter 42 employs ASK modulation, wherein one half the bit is filled with a signal burst, and the other half has no signal. To prevent corruption of the measurement, it is desired to perform AOA measurements only when signal energy is present. That function is carried out by the circuit 85 which receives as the input the logarithmic video signal from the logarithmic amplifier 93 connected to a selected reference element. The input signal is passed through an amplification stage 86 which is adjusted to set the threshold for the lowest level signal that needs to be detected. The diode 88 sets a detection threshold so that any signal that exceeds that level will drive the amplifier 87 to the positive limit. This positive signal is used by the A/D circuits 97 and 98 to start the I and Q signal detection process.

Of course, if another modulation scheme is used that has a constant signal amplitude level, such as FSK, PSK, MSK, the circuit 85 would not be needed.

The respective logarithmically amplified signals from amplifiers 83 and 93 are then passed to synchronous phase detector circuit 95 which provides I and Q signal components to an analog to digital (A/D) gain and offset circuit 96. The Amplifiers 96 are used to change the I and Q channel signals so that their amplitudes represent a phasor whose angle is used to measure the differential phase between the element signals being measured. These signals are then digitized by A/D circuits 97 and 98, and passed to the processor 100.

The control register 89 provides the control signals which operate the switches 81 and 91.

It can be seen that a given baseline of a selected antenna array can be observed at any given time, and all can be observed on a time multiplexed scheme.

Figure 6:
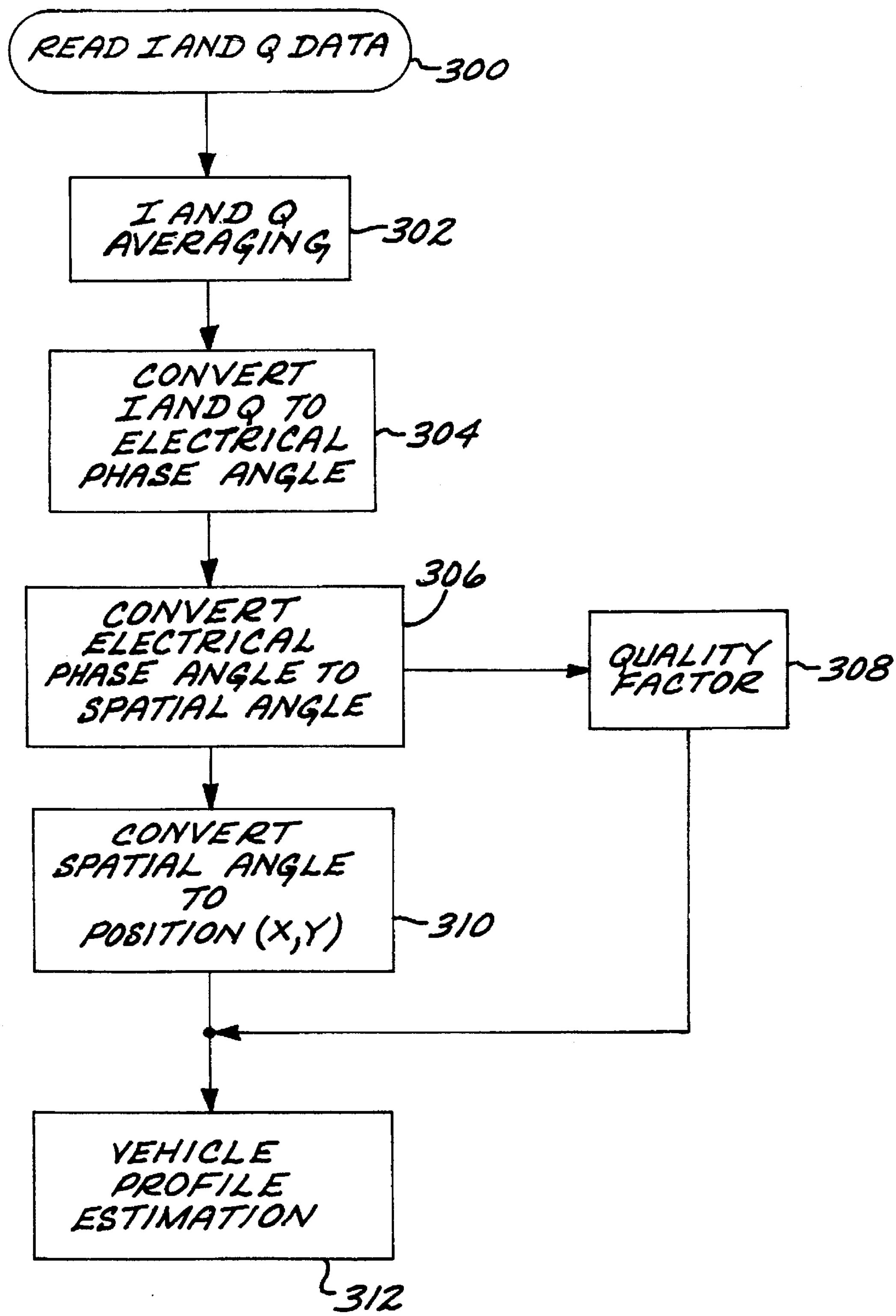
FIG. 6 is a simplified processing flow diagram illustrating the sequence of functions performed by a processor comprising the system of FIG. 1.

FIG. 6 is a simplified flow diagram illustrating the operational flow in the processor 100. At step 100, the I and Q data from the receivers is read. This data is averaged (step 302) to increase the signal-to-noise ratio, and the electrical phase angle is derived from the averaged data. The electrical phase angle is then converted into spatial angle data (step 306). The spatial angle data is then converted to transmitter position information (step 310) and an output in x,y is provided. The spatial angle data is also used to derive the quality factors (step 308) used to weight the x,y position data for the vehicle profile estimation (step 312).

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for tracking a moving transmitter which transmits RF signals, comprising the following steps:

positioning first and second antenna arrays is a spaced arrangement relative to an area in which the transmitter is moving, each antenna array comprising a plurality of antenna elements arranged in spaced relationship, the elements comprising a plurality of baseline pairs of elements, wherein the element-to-element spacing d of elements in the baseline pairs are different for each baseline pair;

receiving RF signals from the transmitter using the first and second antenna arrays and converting baseline signals from each baseline pair of elements into digital data;

processing the digital data to provide phase data indicative of the electrical phases of signals received at the different baseline pairs of the first and second antenna arrays;

converting the phase data into spatial angle data indicative of angle of arrival of RF signals incident on the baseline pairs of the first and second antenna arrays;

processing the spatial angle data with antenna configuration data indicative of the location and geometry of the first and second antenna arrays to provide transmitter position data specifying an estimated position of the transmitter; and determining sample quality weighting factors and weighting the transmitter position data with said factors to compensate for multipath distorted samples.

2. A method for tracking a moving transmitter which transmits RF signals, comprising the following steps:

positioning first and second antenna arrays is a spaced arrangement relative to an area in which the transmitter is moving, each antenna array comprising a plurality of antenna elements arranged in spaced relationship, the elements grouped in a plurality of subarrays of elements, wherein the element-to-element spacings of elements in the subarrays are different multiples of one half the transmitter wavelength of operation;

receiving RF signals from the transmitter using the first and second antenna arrays and converting subarray signals from each array signals into digital data;

processing the digital data to provide phase data indicative of the electrical phases of signals received at the different subarrays of the first and second antenna arrays;

converting the phase data into spatial angle data indicative of angle of arrival of RF signals incident on the subarrays of the first and second antenna arrays;

processing the spatial angle data with antenna configuration data indicative of the location and geometry of the first and second antenna arrays to provide information specifying an estimated position of the transmitter; and determining sample quality weighting factors and weighting the transmitter position data with said factors to compensate for multipath distorted samples.

3. A system for tracking a moving transmitter which transmits RF signals, comprising:

first and second direction finding antenna arrays disposed in a spaced arrangement relative to an area in which the transmitter is moving, each antenna array comprising a plurality of antenna elements arranged in spaced relationship, the elements comprising a plurality of baseline pairs of elements, wherein the element-to-element spacing d of elements in the baseline pairs are different for each baseline pair;

receiver apparatus for receiving RF signals from the transmitter using the first and second antenna arrays and converting baseline signals from each baseline pair of elements into digital data;

processor apparatus for processing the digital data, said apparatus comprising:

means responsive to the digital data to provide phase data indicative of the electrical phases of signals received at the different base-line pairs of the first and second antenna arrays;

means for converting the phase data into spatial angle data indicative of the spatial angle of arrival of RF signals incident on the baseline pairs of the first and second antenna arrays; and means for processing the spatial angle data and antenna configuration data indicative of the location and geometry of the first and second antenna arrays to provide transmitter position data specifying an estimated position of the transmitter;

means for determining sample quality weighting factors; and means for weighting the transmitter position data with said factors to compensate for multipath distorted samples.

4. A method for tracking a moving transmitter which transmits RF signals, comprising the following steps:

positioning first and second antenna arrays is a spaced arrangement relative to an area in which the transmitter is moving, each antenna array comprising a plurality of antenna elements arranged in spaced relationship, the elements comprising a plurality of baseline pairs of elements, wherein the element-to-element spacing d of elements in the baseline pairs are different for each baseline pair;

receiving RF signals from the transmitter using the first and second antenna arrays and converting baseline signals from each baseline pair of elements into digital data;

processing the digital data to provide phase data indicative of the electrical phases of signals received at the different baseline pairs of the first and second antenna arrays;

converting the phase data into spatial angle data indicative of angle of arrival of RF signals incident on the baseline pairs of the first and second antenna arrays; and processing the spatial angle data with antenna configuration data indicative of the location and geometry of the first and second antenna arrays to provide information specifying an estimated position of the transmitter, said processing including finding the intersection of two hyperbolas $H_1$ and $H_2$, and wherein the hyperbolas are represented by $$H_1:\ a_1x^2+a_2y^2+a_3xy+a_4x+a_5y+a_6=0$$

$$H_2:\ b_1x^2+b_2y^2+b_3xy+b_4x+b_5y+b_6=0$$

and wherein the transmitter location is at x,y at a solution of the foregoing equations.

5. A method for tracking a moving transmitter which transmits RF signals, comprising the following steps:

positioning first and second antenna arrays is a spaced arrangement relative to an area in which the transmitter is moving, each antenna array comprising a plurality of antenna elements arranged in spaced relationship, the elements comprising a plurality of baseline pairs of elements, wherein the element-to-element spacing d of elements in the baseline pairs are different for each baseline pair, and wherein no single antenna element comprises each of the plurality of baseline pairs of elements;

receiving RF signals from the transmitter using the first and second antenna arrays and converting baseline signals from each baseline pair of elements into digital data;

processing the digital data to provide phase data indicative of the electrical phases of signals received at the different baseline pairs of the first and second antenna arrays;

converting the phase data into spatial angle data indicative of angle of arrival of RF signals incident on the baseline pairs of the first and second antenna arrays; and processing the spatial angle data with antenna configuration data indicative of the location and geometry of the first and second antenna arrays to provide information specifying an estimated position of the transmitter.

6. A system for tracking a moving transmitter which transmits RF signals, comprising:

first and second direction finding antenna arrays disposed in a spaced arrangement relative to an area in which the transmitter is moving, each antenna array comprising a plurality of antenna elements arranged in spaced relationship, the elements comprising a plurality of baseline pairs of elements, wherein the element-to-element spacing d of elements in the baseline pairs are different for each baseline pair, and wherein no single antenna element comprises each of the plurality of baseline pairs of elements;

receiver apparatus for receiving RF signals from the transmitter using the first and second antenna arrays and converting baseline signals from each baseline pair of elements into digital data;

processor apparatus for processing the digital data, said apparatus comprising:

means responsive to the digital data to provide phase data indicative of the electrical phases of signals received at the different base-line pairs of the first and second antenna arrays;

means for converting the phase data into spatial angle data indicative of the spatial angle of arrival of RF signals incident on the baseline pairs of the first and second antenna arrays; and means for processing the spatial angle data and antenna configuration data indicative of the location and geometry of the first and second antenna arrays to provide transmitter position data specifying an estimated position of the transmitter.

7. The method of claim 1 further comprising the steps of collecting RF signal transmission signals from said transmitter over a period of time to provide a plurality of samples, and processing the samples received over time to provide data indicative of the velocity and acceleration of the moving transmitter.

8. The method of claim 1 wherein said antenna arrays each include first and second checking baseline pairs of elements which are spaced by the same distance d, said checking baseline pairs having baseline factors $c_1$ and $c_2$, and wherein the step of determining sample quality weighting factors includes comparing the electrical phases received at said first and second baseline pairs for a given set of samples, and assigning a small quality weighting factor to a given set of samples if said electrical phases for said first and second baseline pairs are not identical.

9. The method of claim 8 wherein said quality factor provides Gaussian weighting, and is determined in accordance with the following relationship, $$\lambda = \exp\left(-\max\left(\beta_1^2, \beta_2^2\right)/2\sigma^2\right)$$

$$\beta_1 = ((c_2/c_1)\Delta\phi_{c(1)} - \Delta\phi_{c(2)}) \bmod (-180, 180) \text{ at the first antenna array}$$

$$\beta_2 = ((c_2/c_1)\Delta\phi_{c(1)} - \Delta\phi_{c(2)}) \bmod (-180, 180) \text{ at the second antenna array}$$

$\lambda$ represents the weighting factor, $\sigma$ is a selected value for the weighting scheme.

10. The method of claim 1 wherein said antenna array elements are arranged along respective linear array axes, and wherein said array axes are arranged at respective angles with respect to a nominal direction of vehicle movement in relation to the arrays, said angles in the range of about 30 degrees to 60 degrees.

11. The method of claim 1 wherein said spacing d of elements in the baseline pairs is equal to multiples of $\lambda/2$, where $\lambda$ represents the nominal wavelength of the RF signals.

12. The method of claim 11 wherein a first one of the baseline pairs has a spacing d of $\lambda/2$.

13. The method of claim 5, wherein said antenna arrays each includes four antenna elements arranged along a linear axis, and wherein first and second elements are disposed on one side of an antenna center, and the third and fourth elements are disposed on the opposite side of the center, said elements being symmetrically arranged about the antenna center.

14. The method of claim 13 wherein the second and third antenna elements form the first baseline pair and are spaced apart by $\lambda/2$.

15. The method of claim 14 wherein the first and second antenna elements form a second baseline pair and are spaced apart by $\lambda$.

16. The method of claim 14 wherein the second and fourth antenna elements form a third baseline pair spaced apart by $1.5\lambda$, and the first and fourth antenna elements form a fourth baseline pair spaced apart by $2.5\lambda$.

17. The method of claim 4 wherein said solution of said hyperbola equations is determined by substitute for x to establish a quadratic single-variable equation $$c_1y^4 + c_2y^3 + c_3y^2 + c_4y + c_5 = 0$$

and solving for y, and then using ($H_1$) or ($H_2$) to find x.

18. The method of claim 2 further comprising the steps of collecting RF signal transmission signals from said transmitter over a period of time to provide a plurality of samples, and processing the samples received over time to provide data indicative of the velocity and acceleration of the moving transmitter.

19. The system of claim 3 wherein the receiver apparatus collects RF signal transmission signals from said transmitter over a period of time to provide a plurality of samples, and said processor apparatus processes the samples received over time to provide data indicative of the velocity and acceleration of the moving transmitter.

20. The system of claim 19 wherein the processor apparatus further includes means for determining sample quality weighting factors and means for weighting the transmitter position data with said factors to compensate for multipath distorted samples.

21. The system of claim 3 wherein said antenna arrays each include first and second checking baseline pairs of elements which are spaced by the same distance d, said checking baseline pairs having baseline factors $c_1$ and $c_2$, and wherein the means for determining sample quality weighting factors includes means for comparing the electrical phases received at said first and second baseline pairs for a given set of samples, and means for assigning a small quality weighting factor to a given set of samples if said electrical phases for said first and second baseline pairs are not identical.

22. The system of claim 21 wherein said quality factor provides Gaussian weighting, and is determined in accordance with the following relationship, $$\lambda = \exp\left(-\max\left(\beta_1^2, \beta_2^2\right)/2\sigma^2\right)$$

$$\beta_1 = ((c_2/c_1)\Delta\phi_{c(1)} - \Delta\phi_{c(2)}) \bmod (-180, 180) \text{ at the first antenna array}$$

$$\beta_2 = ((c_2/c_1)\Delta\phi_{c(1)} - \Delta\phi_{c(2)}) \bmod (-180, 180) \text{ at the second antenna array}$$

$\lambda$ represents the weighting factor, $\sigma$ is a selected value for the weighting scheme.

23. The system of claim 3 wherein said antenna array elements are arranged along respective linear array axes, and wherein said array axes are arranged at respective angles with respect to a nominal direction of vehicle movement in relation to the arrays, said angles in the range of about 45 degrees to 60 degrees.

24. The system of claim 3 wherein said spacing d of elements in the baseline pairs is equal to multiples of $\lambda/2$, where $\lambda$ represents the nominal wavelength of the RF signals.

25. The system of claim 24 wherein a first one of the baseline pairs has a spacing d of $\lambda/2$.

26. The system of claim 3 wherein no single antenna element comprises each of the plurality of baseline pairs of elements.

27. The system of claim 6 wherein said antenna arrays each includes four antenna elements arranged along a linear axis, and wherein first and second elements are disposed on one side of an antenna center, and the third and fourth elements are disposed on the opposite side of the center, said elements being symmetrically arranged about the antenna center.

28. The system of claim 27 wherein the second and third antenna elements form the first baseline pair and are spaced apart by $\lambda/2$.

29. The system of claim 28 wherein the first and second antenna elements form a second baseline pair and are spaced apart by $\lambda$.

30. The system of claim 29 wherein the second and fourth antenna elements form a third baseline pair spaced apart by $1.5\lambda$, and the first and fourth antenna elements form a fourth baseline pair spaced apart by $2.5\lambda$.

* * * * *